Patented June 21, 1938

2,121,335

UNITED STATES PATENT OFFICE 2,121,335

METHOD OF MAKING A VARNISH BASE

George Barsky, New York, N. Y., and Samuel S. Gutkin, Irvington, N. J.; said Gutkin assignor to said Barsky No Drawing. Application June 18, 1935, Serial No. 27,206

9 Claims. (Cl. 134—26)

This invention relates to oil varnishes, namely, to varnishes made with drying oils and containing synthetic resins.

In a copending application of one of the present applicants, Ser. No. 26,401, filed June 13, 1935, entitled "Method of preparing an oil varnish", there is described a method for producing oil varnishes wherein use is made of a modified phthalic glyceride type of resin which is blended with the drying oil in accordance with old and well established varnish makers' practice. The invention in said application is based upon the discovery that certain of the modified phthalic glyceride resins could be directly blended by ordinary cooking with a drying or other oil and that under certain conditions the amount of drying oil which could thus be blended was substantially unlimited, and that thereby oil varnishes of any desired oil length and drying properties could be made.

Since in oil varnishes of the type therein described the phthalic glyceride resin imparts highly desirable properties, it is in many cases desirable to incorporate a maximum amount of the resin. It is known that the phthalic glyceride type of resin is particularly desirable for oil varnishes in that substantially all of the properties of such resins are useful in materially improving the properties of the resulting varnish. Heretofore it was considered impossible to directly blend a phthalic glyceride with a drying oil or with an oil varnish base. A method has been proposed in the prior art wherein the phthalic glyceride was heated with a drying oil in the presence of a high boiling solvent common to the two materials, with or without the use of an autoclave and high pressures. While such a process might be used to cause incorporation of the two materials, it has never been commercially practiced because of the presence of the high boiling solvent and the necessity of using high temperatures. If the solvent be not removed it would impair the properties of the final product. If the high boiling solvent be removed by boiling, decomposition and other detrimental changes would take place.

The present invention is designed to allow the production of oil varnishes by the use of any desired quantity of phthalic glyceride resin and is particularly adapted to produce varnishes wherein there is a high phthalic glyceride content. The present invention utilizes merely the old and well established varnish makers' practice of direct heating or cooking of resin and oil to cause blending and it also utilizes the phthalic glyceride resin without the necessity of modifying the same prior to the blending and without the use of special expedients.

More particularly, the present invention is based upon the discovery that if one first prepares an oil varnish base by the blending of a drying oil with a modified phthalic glyceride resin in in any suitable manner, as for example, in accordance with the copending application above referred to, then one may by the addition of phthalic glyceride resin to the varnish base at a proper temperature, increase the resin content of the varnish to the desired extent. This is of great advantage as it enables one by the use of but two resins, namely, phthalic glyceride and modified phthalic glyceride, to make any desired combination or proportion of resins and oils within substantially the entire useable range of varnishes.

An equivalent result could not be obtained in the prior art, according to which it was necessary to react phthalic anhydride, glycerine and the fatty acids of drying oils to give true resins, which were dissolved and used in place of oil varnishes. This required the production of a resin for each varnish, necessitating the initial production of a relatively large number of resins. Furthermore, the procedures of the prior art in accomplishing such a result were complicated and required special skill and control of the operations, so that it was no longer possible for the ordinary varnish maker to produce the varnish bases, but such manufacture was necessarily done in a chemical manufacturing plant.

The present invention, on the other hand, makes the production of an oil varnish from drying oils and phthalic glyceride resins so simple that the ordinary varnish maker with his equipment and with his knowledge may make any type of blend which he may require or desire without any special skill or apparatus or control.

In practicing the invention we first provide a modified phthalic glyceride resin made in any desired manner by the use of various modifying agents. In general, such agents are organic acids, such as resin acids, carboxylic or sulfonic acids; higher fatty acids, such as stearic, oleic, linoleic, ricinoleic, and the like; aromatic acids, such as benzoic, and so forth. Such a resin is then heated with a drying oil or mixtures of drying oils or mixtures of drying oils with semi- or non-drying oils, until blending has taken place. Thereafter, phthalic glyceride resin is added and heating continued until the latter has become blended with the varnish base.

It is often advantageous to repeat the operation by adding to the varnish base as above described, additional drying oil and heating to cause blending thereof, after which more phthalic glyceride may be added and the heating continued as before to cause blending. If desired, the cycle may be repeated for any number of blendings.

The following are several examples which indicate the nature of the present invention:

Example 1

80 parts by weight castor oil, 148 parts of phthalic glyceride and 75 parts of 95% glycerine are heated together to a temperature of about 280°–290° C. for one half to one hour, whereby a reaction takes place to produce a castor oil phthalic glyceride resin having an acid number of about 42.5 and a softening point of about 72° C.

200 parts by weight of linseed oil are heated to a temperature of about 285° C. over a period of about forty minutes and $CO_2$ gas is introduced over the oil to provide a neutral atmosphere and to avoid discoloration during the subsequent reaction. About 275 parts of castor oil phthalic glyceride are added in small portions at a time over a period of about thirty minutes and the heating is continued at a temperature of about 285°–290° C. for about another thirty minutes to cause complete blending or digestion of the resin in the oil. Then an additional portion of about 275 parts of the castor oil phthalic glyceride resin are added in small portions and the temperature maintained at about 260° C. until blending is complete.

The phthalic glyceride resin is made by heating 35 parts by weight of phthalic anhydride and 15 parts of 95% glycerine to a temperature of about 200° C., whereby phthalic glyceride is formed. The oil varnish base described above is maintained at a temperature of about 280° C. and to 100 parts thereof there is added about 45 parts of linseed oil, the heating being continued for about one half hour to cause blending to take place. Thereafter the phthalic glyceride resin is added over a period of about 30 minutes during which time the reaction temperature is allowed to fall from 295° C. down to 240° C. This produces an excellent dispersion and a clear varnish base in the molten state is produced. The varnish is allowed to cool to about 100° C. and suitable solvents are added thereto to form the varnish solution.

Example 2

200 parts by weight of oleic acid, 220 parts of phthalic anhydride and 120 parts of 95% glycerine are heated to 260° C. in about 65 minutes and held at a temperature of 260°–270° C. for thirty minutes while introducing carbon dioxide to produce an inert atmosphere.

225 parts by weight of linseed oil are heated to a temperature of 260°–270° C. and are added to the resin, held at the same temperature, over a period of about 17 minutes and thereafter the temperature is maintained for an additional 10 minutes.

135 parts by weight of phthalic anhydride and 60 parts of 95% glycerine are heated to 190° C. until a clear liquid is formed, which is added to the varnish base formed as stated above over a period of about 35 minutes. The temperature thereof will drop from 265° to about 225° C. and the mixture is held at the latter temperature for about 40 minutes, until a clear liquid (A) is formed.

To 450 parts of this clear liquid (A) at 260° C., 139 parts of linseed oil are added in 12 minutes. The temperature is held at 260° for twenty minutes more. Then phthalic glycerine resin made as above from 114 parts of phthalic anhydride and 50 parts of 95% glycerine is added in 8 minutes. The batch is held at 225° C. for forty minutes more giving varnish base (B).

To 372 parts of varnish base (B) 115 parts of linseed oil are added at 260°–265° C. in 6 minutes. After holding at this temperature for 9 minutes more, phthalic glyceride made from 134 parts of phthalic anhydride and 59 parts of glycerine are added. The temperature is raised to 290° C. and dropped immediately. At 260° C. 48 parts of linseed oil are added and the temperature is maintained for thirty minutes more.

Example 3

193 parts of linseed fatty acids, 88 parts of 95% glycerine and 148 parts of phthalic anhydride are heated to 285°–289° C. At this temperature 100 parts of tung oil are added over a period of 15 minutes. Ten minutes later phthalic glyceride, made by heating 404 parts of phthalic anhydride and 180 parts of 95% glycerine until a clear bead is formed on cooling a drop, is added in 22 minutes and the temperature is dropped to 230° C. The batch is held at this temperature for 40 minutes.

Example 4

155 parts of linseed oil are heated to 280° C. in 45 minutes. At this temperature 100 parts of a 100% oil soluble phenol-formaldehyde varnish resin are added over a period of 15 minutes. Then 62 parts of phthalic glyceride, prepared as in the previous examples, are added over a period of forty minutes. The temperature is held for about 85 minutes to dissolve some gel particles that are formed initially.

One hundred parts of the above varnish base and 50 parts of linseed oil are heated to 285°–295° C. in thirty minutes. 62 parts of phthalic glyceride are then added over a twenty minute interval. The batch is held at temperature for an additional ten minutes, or until blending is complete.

Oil varnish bases made in accordance with the examples described above have highly desirable properties, in that they are highly soluble in various solvents, including the relatively inexpensive hydrocarbons. The varnishes are capable of blending with all type of pigments and may be modified by plasticizers, other resins, and the like, as is well known. Various properties may be imparted to the oil varnishes of the present invention and they may be made to air-dry in an extremely short time to give a hard film or to dry over a longer period so as to allow brushing thereof. Said varnishes are excellently suited for use as baking varnishes in addition to having highly desirable properties as air-drying varnishes.

An important feature of the present invention is the fact that oil varnishes may be made without the use of free fatty acids, utilizing the oils themselves, which are less costly and which are more readily handled.

From the above it will be apparent that with only two resins, one may make oil varnishes with various oils; not only linseed or tung oil, but also the other drying, semi-drying and non-drying oils, such as soya bean oil, rapeseed oil, olive oil, and the like.

While we have given above several examples of the operation of the invention, said examples are to be considered not as limiting the invention but as illustrating the varied character of procedure and of conditions which may be used in practicing the invention. It will be apparent that in making the resins various proportions of ingredients may be used and that the blending of the resins with the oils may be made in any desired proportions. The temperatures and times and constituents mentioned in the specific examples may be varied within wide limits with good results. Oftentimes such variations will produce highly desirable variations in the properties of the finished varnishes.

In the procedures outlined, the order in which the various ingredients may be added and blended or reacted to form the varnish base and/or the resins, may be changed to suit conditions. Furthermore, the other conditions of blending may be modified within the skill of the ordinary worker in the art. The proportions of oleic acid, castor oil or other modifying agent may be varied within wide limits to give different properties. If a quick air-drying varnish is desired, a low final content, say 5% or less, of oleic acid may be used. On the other hand, for a baking varnish, a large amount, say as high as 20%, may be present in the final varnish base. Instead of as in Example 2 adding the resin and oil alternately, we may simultaneously add oil and resin to the hot varnish base, the rates of addition and the temperature being regulated to give the desired blending.

In place of or in conjunction with phthalic anhydride and glycerine, equivalent substances may be employed. The phthalic glyceride may be added to the hot varnish base either in the cold, solid state or in the hot, fluid state, and it may be at a temperature less than 200° C. or at a higher temperature approximating that of the hot varnish base. Where tung oil is used it is advantageous to add the phthalic glyceride at a relatively low temperature to avoid gelling of the oil. A modified phthalic glyceride resin may be used for blending with the varnish base. Other resins than described above may be employed in making the oil varnish base, such as ester gums, rosin-phenol-formaldehyde resins and the like.

From the above it will be apparent that the procedure outlined above is susceptible of many and wide variations. The invention is, therefore, not to be considered as narrow in scope but of broad character and is to be limited only by the scope of the claims appended hereto.

What we claim is:

1. A method of preparing an oil varnish which comprises providing a varnish resin taken from the class consisting of phenol-formaldehyde resins soluble in drying oils, ester gum, phthalic glyceride resin modified by an organic acid taken from the class consisting of resin acids, higher fatty acids and aromatic acids, heating the same with a drying oil until blending has taken place, adding an unmodified phthalic glyceride type resin and heating until blending has taken place.

2. A method of preparing an oil varnish which comprises providing a phthalic glyceride resin modified by an organic acid taken from the class consisting of resin acids, higher fatty acids and aromatic acids, heating the same with a drying oil until blending has taken place, adding thereto an unmodified phthalic glyceride and heating until blending has taken place.

3. A method of preparing an oil varnish which comprises providing a castor oil fatty acid modified phthalic glyceride resin, heating the same with a drying oil until blending has taken place, adding thereto an unmodified phthalic glyceride and heating until blending has taken place.

4. A method of preparing an oil varnish which comprises providing a drying oil fatty acid modified phthalic glyceride resin, heating the same with a drying oil until blending has taken place, adding thereto an unmodified phthalic glyceride and heating until blending has taken place.

5. A method of preparing an oil varnish which comprises providing a phthalic glyceride resin modified by an organic acid taken from the class consisting of resin acids, higher fatty acids and aromatic acids, heating the same with a mixture of linseed and tung oils until blending has taken place, adding thereto an unmodified phthalic glyceride and heating until blending has taken place.

6. A method of preparing an oil varnish which comprises providing a phthalic glyceride resin modified by an organic acid taken from the class consisting of resin acids, higher fatty acids and aromatic acids, heating the same with a drying oil until blending has taken place, adding thereto an unmodified phthalic glyceride and heating until blending has taken place, adding more drying oil and heating as before.

7. A method of preparing an oil varnish which comprises providing an oil varnish base containing phthalic glyceride resin modified by an organic acid taken from the class consisting of resin acids, higher fatty acids and aromatic acids, maintaining the same at an elevated temperature sufficiently high to cause blending of the resin with the oil, adding thereto a drying oil and an unmodified fusible phthalic glyceride resin, the rate of addition being such that at the temperature of the mass blending takes place.

8. A method of preparing an oil varnish which comprises providing a phthalic glyceride resin modified by an organic acid taken from the class consisting of resin acids, higher fatty acids and aromatic acids, heating the same with a drying oil until blending has taken place, adding thereto an unmodified phthalic glyceride and a drying oil substantially simultaneously, and heating to cause blending to take place.

9. A method of preparing an oil varnish which comprises providing a phthalic glyceride resin modified by an organic acid taken from the class consisting of resin acids, higher fatty acids and aromatic acids, heating the same with a drying oil until blending has taken place, adding thereto an unmodified phthalic glyceride and a drying oil substantially simultaneously, and the rates of addition thereof and the temperature being so regulated as to cause blending to take place.

GEORGE BARSKY.
SAMUEL S. GUTKIN.